H. N. HANSEN.
SLED ATTACHMENT AND PROPELLER FOR MOTOR VEHICLES.
APPLICATION FILED MAY 18, 1916.
1,273,777.
Patented July 23, 1918.
2 SHEETS—SHEET 1.
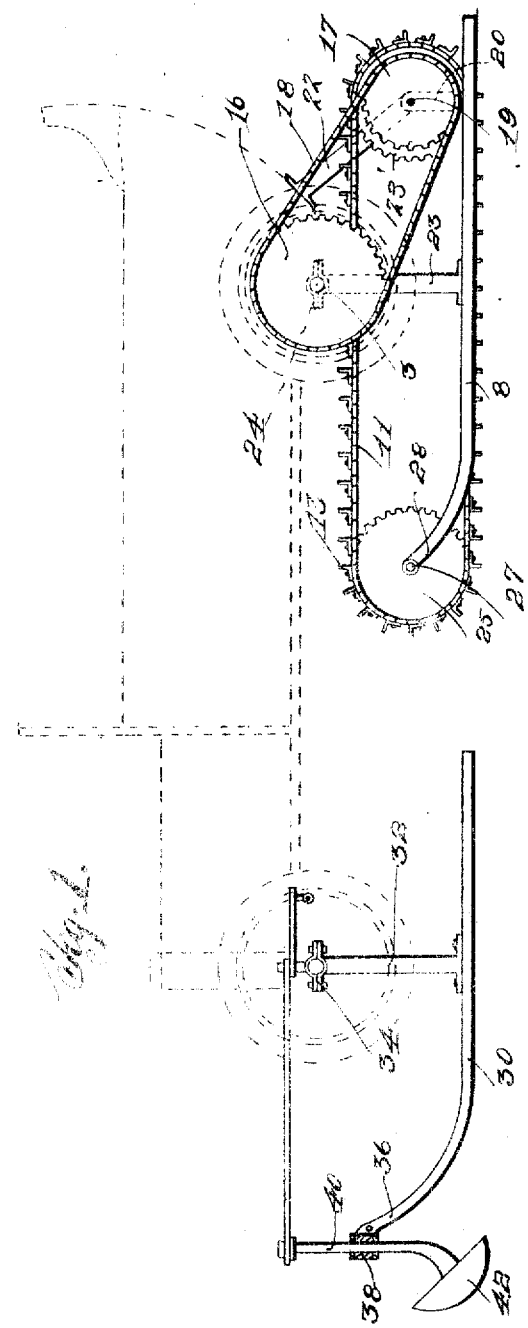
Hans N Hansen
Inventor
By Geo. Kimmel
Attorney H. N. HANSEN.
SLED ATTACHMENT AND PROPELLER FOR MOTOR VEHICLES.
APPLICATION FILED MAY 18, 1916.
1,273,777.
Patented July 23, 1918.
2 SHEETS—SHEET 2.
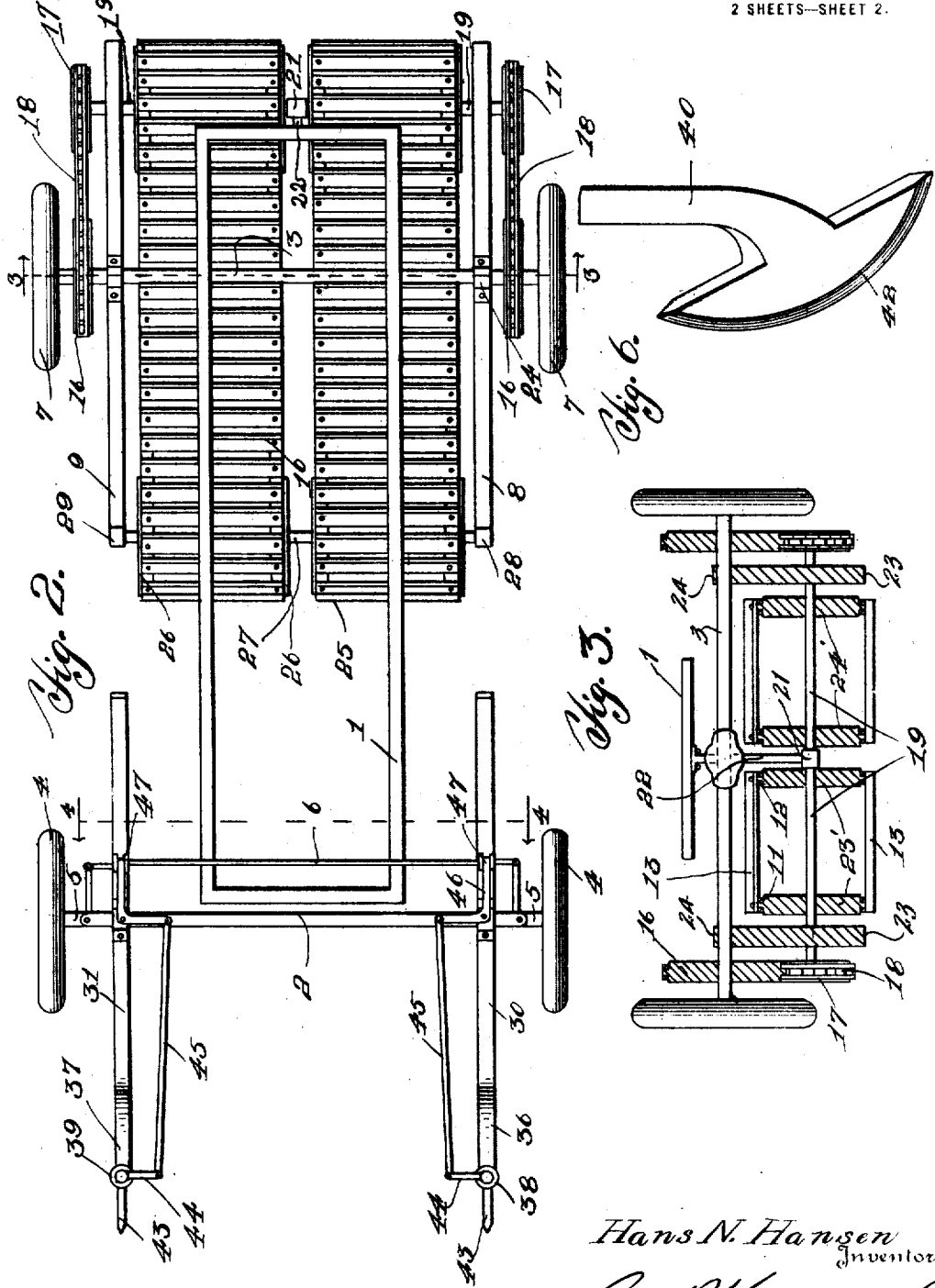
Hans N. Hansen
Inventor
By Geo. P. Kimmel
Attorney

UNITED STATES PATENT OFFICE.

HANS N. HANSEN, OF WESTBROOK, MINNESOTA.

SLED ATTACHMENT AND PROPELLER FOR MOTOR-VEHICLES.

1,273,777.     Specification of Letters Patent.     Patented July 23, 1918.

Application filed May 18, 1916. Serial No. 98,407.

*To all whom it may concern:*

Be it known that I, HANS N. HANSEN, a citizen of the United States, residing at Westbrook, in the county of Cottonwood and State of Minnesota, have invented new and useful Improvements in Sled Attachments and Propellers for Motor-Vehicles, of which the following is a specification.

The present invention relates to new and useful improvements in motor vehicles, and has particular reference to improvements in sled propelling devices for attachment to motor vehicles.

The primary object of my invention is to provide improved means for attachment to an automobile or the like motor vehicle whereby to propel the same over snow and ice, the structure being detachably associated with the motor vehicle, whereby the same may be employed in its usual capacity, when not in use as a sled.

Another object of my invention is to provide a device of the character described having improved steering means associated therewith, said steering means being fastened to the forward end of the vehicle, means being provided for connecting the sled steering means of my invention to the usual steering mechanism of the motor vehicle. In this way, the motor vehicle when used as a sled, may be controlled from the driver's seat and steered by the usual steering wheel. The structure of the device is such that no material alterations are required to be made in the structure of the motor vehicle.

Other objects and advantages to be derived from the use of my improved sled attachment for motor vehicles will appear from the following detail description and the claim, taken with an inspection of the accompanying drawings, in which—

Figure 1 is a side elevational view of a device embodying the improvements of my invention, a motor vehicle being shown in dotted lines associated therewith, Fig. 2 is a top plan view of the same, Fig. 3 is a transverse sectional view taken on the line 3—3 of Fig. 2, looking in the direction of the arrow, Fig. 4 is a similar view taken on the line 4—4 of Fig. 2, looking in the direction of the arrows, Fig. 5 is an enlarged detail perspective view showing the manner in which the propelling elements are secured to the driving chains, and Fig. 6 is an enlarged fragmentary perspective view showing the steering blade of my invention.

Referring more particularly to the drawings, wherein similar characters of reference designate like and corresponding parts throughout the various views, 1 designates the chassis or frame of a motor vehicle, the usual front and rear axles 2 and 3, respectively, being carried thereby. The steering wheels 4 are mounted on the usual stub-axles connected by the transverse rod 6 which may have the usual steering wheel and gear associated therewith, the same not being shown. The usual rear or driving wheels 7 are provided.

The propelling mechanism of my invention includes in combination with sled runners 8 and 9, a pair of endless propelling chains or tractors 10, said tractors being identical in construction and therefore a brief description of one will suffice. The tractor proper is built up of a pair of endless chains 11 and 12 having riveted thereto, at predetermined intervals, a plurality of transverse angle-irons 13 forming snow and ice engaging elements. As best shown in Fig. 5, the angle-iron is placed upon one of the solid links 14 of the chain and riveted thereto as at 15. The chain shown in the drawing is the conventional form of sprocket chain, it being of course understood that I do not limit myself to the use of this type of chain exclusively.

I provide means for driving the propeller 10, said means including a pair of sprocket wheels 16 carried by the axle 3 and rotatable with the driving wheels 7, power being received from the said sprocket wheels 16 by a pair of sprocket wheels 17 through the medium of a pair of chains 18.

The sprocket wheels 17 are mounted on a pair of shafts 19 carried in bearings 20 on the runners 8 and 9, the inner ends of the shafts 19 being mounted in a bearing 21 carried by a bracket arm 22 extending from the frame or chassis 1 of the motor vehicle. The runners 8 and 9 are attached to the rear axle 3 by means of vertical brackets 23 carrying clamps 24 on their upper free ends, said clamps engaging said rear axle as best shown in Figs. 1 and 2

The chains 11 and 12 are trained over pairs of sprocket wheels 23' and 24' mounted on the shafts 19, the forward end of the chains being trained over pairs of sprocket wheels 25 and 26 carried and rotatable on a transversely arranged shaft 27 mounted in the up-turned ends 28 and 29 of the runners 8 and 9, respectively. Thus it will be seen that when the engine of the motor vehicle is started, power will be transmitted to the propeller by virtue of the sprocket wheels 16, chains 18, sprockets 17, and thence to the shafts 19. It will be readily apparent that the propellers 10 are independently driven, that is, the differential gearing of the automobile is employed for serving to assist the sled propelling device in negotiating curves.

The steering mechanism of my invention includes a pair of front runners 30 and 31 having vertical standards 32 and 33 carried thereby, said standards having clamps 34 and 35 on their upper free ends for clamping engagement with the front axle 2 of the motor vehicle.

The forward ends of the runners 30 and 31 are up-turned as at 36 and 37 and provided with bearings 38 and 39. The steering staffs 40 and 41 are mounted in the bearings 38 and 39, the lower ends of said staffs carrying blades 42 and 43 adapted to engage the ice or snow. The upper free ends of the staffs mentioned are provided with inwardly extending arm portions 44 connected by means of links 45 to bell-crank levers 46 pivoted on the clamps 34 and 35, said bell-crank levers being connected as at 47 to the transverse rods 6 of the said steering mechanism.

Thus it will be seen that when the steering mechanism of the motor vehicle is actuated in the usual manner the rod 6 will be caused to move transversely of the vehicle, this movement being imparted to the blades 42 and 43, thereby steering the sled.

It is of course to be understood that the runners 30 and 31 are rigidly connected with the front axle of the motor vehicle. The steering blades are semi-circular in contour, one of the same being best shown in Fig. 6.

In operation it will be seen that when my improved sled attachment for motor vehicles is applied to an automobile or the like, the latter may be easily propelled through ice and snow, a maximum traction surface being provided by virtue of the propellers 10. The arrangement of the steering mechanism facilitates the turning of the device without the necessity of providing turning runners on the forward end of the machine.

From the above description taken in connection with the accompanying drawings, it is thought that a clear and comprehensive understanding of the construction, operation and advantages of my invention may be had, and while I have shown and described my invention as embodying a specific structure, I desire that it be understood that I may make such changes in said structure as do not depart from the spirit and scope of the invention as claimed.

What I claim as new and desire to secure by Letters Patent is:

The combination with a motor vehicle, including, the chassis and the rear driving axle, of a pair of vertical brackets extending from the rear axle, clamp members retaining said brackets on the axle, runners mounted on the brackets, the forward end of said runners being upturned, a transversely extending shaft mounted in said upturned portions, sprocket wheels loosely mounted on said shaft, bearing members on the rear ends of the runners, a pair of shafts having their ends mounted in the last mentioned bearings, sprocket wheels mounted on the said pair of shafts, a tread element movable over each of said sprocket wheels, and means for connecting the driving axle to said pairs of shafts, as and for the purpose set forth.

In testimony whereof, I affix my signature hereto.

HANS N. HANSEN.